United States Patent
Hendriks

(10) Patent No.: US 7,633,708 B2
(45) Date of Patent: Dec. 15, 2009

(54) COLLAPSIBLE BYPASS CHANNEL DISPOSED OUTSIDE OF DISK DRIVE HOUSING

(75) Inventor: Ferdinand Hendriks, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 559 days.

(21) Appl. No.: 11/113,639

(22) Filed: Apr. 25, 2005

(65) Prior Publication Data

US 2006/0238915 A1     Oct. 26, 2006

(51) Int. Cl.
G11B 25/04   (2006.01)
G11B 33/00   (2006.01)
G11B 5/012   (2006.01)
G11B 33/08   (2006.01)

(52) U.S. Cl. .................................... 360/97.02

(58) Field of Classification Search ............. 360/97.01, 360/97.02, 97.03, 98.01; 720/648, 649
See application file for complete search history.

(56) References Cited

U.S. PATENT DOCUMENTS

| | | | |
|---|---|---|---|
| 3,731,291 A | 5/1973 | Walsh | |
| 4,429,336 A * | 1/1984 | Berube et al. | 360/97.03 |
| 4,471,395 A * | 9/1984 | Beck et al. | 360/97.03 |
| 4,980,783 A | 12/1990 | Moir et al. | |
| 5,491,596 A * | 2/1996 | Kobori | 360/97.03 |
| 5,617,267 A | 4/1997 | Kawagoe et al. | |
| 6,178,059 B1 | 1/2001 | Frees | |
| 6,369,977 B1 * | 4/2002 | Imai et al. | 360/97.02 |
| 6,369,978 B1 * | 4/2002 | Shimizu et al. | 360/97.03 |
| 6,373,654 B1 | 4/2002 | Iwahara et al. | |
| 6,628,475 B2 | 9/2003 | Nakamoto et al. | |
| 6,643,914 B1 * | 11/2003 | Xu | 360/97.02 |
| 6,785,082 B2 | 8/2004 | Fiorvanti et al. | |
| 6,890,291 B2 * | 5/2005 | Robinson et al. | 494/42 |
| 2002/0039253 A1 * | 4/2002 | Imai et al. | 360/97.02 |
| 2002/0071203 A1 * | 6/2002 | Nakamoto et al. | 360/97.02 |
| 2002/0181148 A1 | 12/2002 | Dahlenburg et al. | |
| 2003/0081350 A1 * | 5/2003 | Wang et al. | 360/97.02 |
| 2004/0252405 A1 * | 12/2004 | Sun et al. | 360/97.02 |
| 2005/0270692 A1 * | 12/2005 | Adams et al. | 360/97.02 |

FOREIGN PATENT DOCUMENTS

| | | |
|---|---|---|
| JP | 52078408 | 7/1977 |
| JP | 1033789 | 2/1989 |
| JP | 1092986 | 4/1989 |
| JP | 6052642 | 2/1994 |
| JP | 6124552 | 5/1994 |

OTHER PUBLICATIONS

"Non-Clean Toom Servo Track Writing of a Pressurized Disk Encosure." IBM Anon. Discl. RO8910445 Sep. 1992.

* cited by examiner

*Primary Examiner*—Craig A Renner

(57) ABSTRACT

Embodiments of the present invention are directed to a data storage device that comprises a housing and a disk pack mounted to the housing which has a plurality of disks that are rotatable relative to the housing. The disk pack defines an axis of rotation and a radial direction relative to the axis. The disk pack has an upstream side wherein air flows away from the disks, and a downstream side wherein air flows toward the disk. The data storage device further comprises an actuator mounted to the housing which is movable relative to the disk pack and a bypass channel for directing an airflow generated by rotation of the disks from the upstream side of the disk pack to the downstream side of the disk pack.

10 Claims, 4 Drawing Sheets

US 7,633,708 B2

COLLAPSIBLE BYPASS CHANNEL DISPOSED OUTSIDE OF DISK DRIVE HOUSING

FIELD OF THE INVENTION

The present invention is directed to the field of data storage devices.

BACKGROUND OF THE INVENTION

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a substantially constant rotational speed. An actuator arm or slider is utilized to reach out over the disk. The arm has a head-gimbal-assembly (HGA) composed of a suspension, flexure and a slider carrying the read/write components.

In operation, the hard disk is rotated at a set speed via a spindle motor assembly having a central drive hub. Additionally, there are tracks evenly spaced at known intervals across the disk. When a request to read a specific portion or track is received, the actuator and servo-system of the hard drive aligns the head, via the arm, over the specific track location and the head reads the information from the disk. In the same manner, when a request to write to a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

A second refinement to the hard disk drive is the increased efficiency and reduced size of the spindle motor spinning the disk. That is, as technology has reduced motor size and power draw for small motors, the mechanical portion of the hard disk drive can be reduced and additional revolutions per minute (RPMs) can be achieved. For example, it is not uncommon for a hard disk drive to reach speeds of 15,000 RPMs. This second refinement provides weight and size reductions to the hard disk drive, it also provides a faster read and write rate for the disk thereby providing increased speed for accessing data. The increase in data acquisition speed due to the increased RPMs of the disk drive and the more efficient read/write head portion provide modern computers with hard disk speed and storage capabilities that are continually increasing.

However, the higher RPMs of the disk have resulted in problems with respect to the interaction of the air with components of the hard disk drive. For example, although the hard disk drive is closed off from the outside, it has an amount of air within its packaging. As the disk spins and the RPMs increase, the air within the hard disk drive package will also begin to rotate and will eventually approach the speed at which the disk is rotating especially near the spindle hub and disk surfaces. This is due to the friction between the disk and the air. In general, Reynolds numbers are used to represent the flow characteristics. For example, in one case the Reynolds number may be based on the tip speed of the disk. That is, the linear velocity at the outer diameter of the disk.

Only when the Reynolds number is sufficiently small (e.g., an enclosure with reduced air density), the air may stay in laminar flow with the boundary layer of air remaining smooth with respect to the rotating disk. However, any obstructions to the flow will result in turbulence. That is, due to the introduction of obstructions to the airflow at large Reynolds numbers (e.g., typically several thousands based on the disk-to-disk spacing and the local disk circumferential velocity), the airflow will become turbulent as it passes the obstruction.

As is well known from fluid mechanics, the characteristics of hard drive components placed in turbulent airflow can include buffeting, harmonic vibration, and the like. Each of these characteristics will result in problematic motion for the arm and head portion and/or the rotating disk. The problematic motion will result in excessive track misregistration (TMR). This is even more significant as the tolerances are further reduced.

Data is stored on the disks on a series of concentric circles that are also referred to as "servo tracks" which are assigned a track number so that the HGA can locate a specific track on a given disk. A servo system controls the HGA to move the read/write head over a defined track on a given disk and maintains the read/write head over the defined track, typically based upon data that is read from a servo track written onto the disk.

This data is written onto the surface of the disks in a process called "servo writing." One servo writing process uses a machine called a "servo writer" to mechanically position the actuator at a desired track position where servo track position data is then written onto the disks. In another process, called "self servo writing," the hard disk drive itself is used to position the actuator when writing the tracks. Typically, the actuator is moved to the position of the disk closest to the spindle and a track position data is written. The servo motor moves the arm laterally to a position corresponding to the next track and the servo track position data is written for that track. It is important during the servo track writing process to minimize vibration or other disturbances to the actuator so that the actuator can be precisely positioned in a stable manner. Otherwise, irregularly shaped (e.g., not round) servo tracks are written onto the disks.

Every disk drive created has a TMR budget and allowances to compensate for aerodynamic buffeting of the actuator are a significant portion of the TMR budget. Thus, a greater allowance for TMR (e.g., due to aerodynamic buffeting) results in increased track pitch and reduced area density on a given disk. As the data storage industry strives for innovations to improve area density of hard disk drives, it is important to reduce the pitch between successive servo tracks on the disks.

SUMMARY OF THE INVENTION

Accordingly, a need exists to reduce aerodynamic buffeting of the disk drive actuator, especially during the servo track writing process.

Embodiments of the present invention are directed to a data storage device that comprises a housing and a disk pack mounted to the housing which has a plurality of disks that are rotatable relative to the housing. The disk pack defines an axis of rotation and a radial direction relative to the axis. The disk pack has an upstream side wherein air flows away from the disks, and a downstream side wherein air flows toward the disk. The data storage device further comprises an actuator mounted to the housing which is movable relative to the disk pack and a bypass channel for directing an airflow generated by rotation of the disks from the upstream side of the disk pack to the downstream side of the disk pack.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
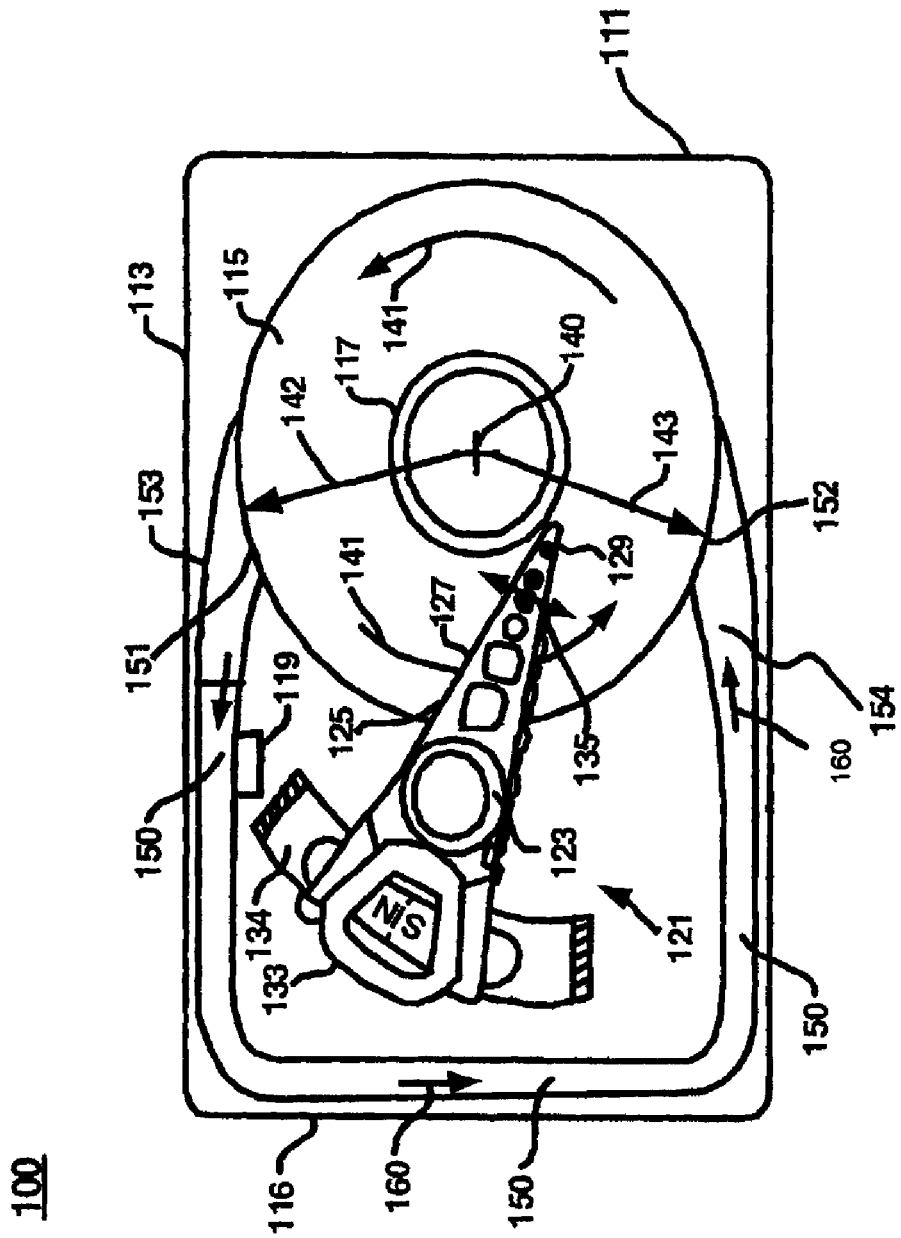
FIG. 1 shows an exemplary information storage system in accordance with embodiments of the present invention.

With reference now to FIG. 1, a schematic drawing of one embodiment of an information storage system 100 comprising a magnetic hard disk file or drive 111 for a computer system is shown. Drive 111 has an outer housing or base 113 containing a disk pack having at least one media or magnetic disk 115. The disk or disks 115 are rotated (see arrows 141) by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly (HGA) comprises the head and the slider 129, which are mounted on suspension 127. The slider 129 is usually bonded to the end of suspension 127. The head is typically pico size (approximately 1160×1000×300 microns) and formed from ceramic or intermetallic materials. The head also may be of "femto" size (approximately 850×700×230 microns) and is preloaded against the surface of disk 115 (in the range two to ten grams) by suspension 127.

Suspensions 127 have a spring-like quality, which biases or urges the air-bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Referring still to FIG. 1, the disk pack and disks 115 (one shown) define an axis 140 of rotation 141 and radial directions 142, 143, relative to the axis 140. The drive 111 also has a bypass channel 150 formed in the housing 113 for directing the airflow 160 generated by rotation of the disks 115 from the upstream side of the disk pack or disks (e.g., proximate to radial direction 142 in FIG. 1) 115 to the downstream side of the disk pack or disks 115 (e.g., proximate to radial direction 143 in FIG. 1). In the embodiment shown, the bypass channel 150 is located between an outer perimeter 116 (FIG. 1) of the housing 113 and the actuator 121, such that the bypass channel 150 completely circumscribes the actuator 121. However, in embodiments of the present invention, a different configuration of bypass channel 150 is implemented. Especially in non-server drives, there is usually not enough room to implement a bypass channel during normal operation. However, a temporary bypass fitted to the drive during manufacturing can be beneficial during the servo-writing process. Bypass channel 150 further comprises a first opening 151 proximate to upstream side wherein air is conveyed away from the disks 115 and a second opening 152 proximate to downstream side wherein airflow 160 is directed toward the disks 115.

As shown in FIG. 1, one embodiment of the drive 111 bypass channel 150 constructed in accordance with the present invention also comprises a diffuser 153. In the embodiment shown, the diffuser 153 is located in the bypass channel 150 and is positioned adjacent to the upstream side of the disk pack or disks 115. The diffuser 153 is also offset upstream from the disks 115 in the radial direction 142, such that the diffuser 153 reduces airflow drag from the disks 115 due to disk wake in the bypass channel 150. This type of aerodynamic drag is commonly called base drag. In embodiments of the present invention, bypass channel 150 exhibits low flow resistance to airflow 160.

Alternatively, or operating in conjunction with the diffuser 153, another embodiment of the drive 111 may include a contraction 154 (e.g., a Venturi). The contraction 154 is also located in the bypass channel 150, but is adjacent to the downstream side of the disk pack or disks 115. Like the diffuser 153, the contraction 154 is typically offset downstream from the disks 115, but in a radial direction 143. Each of the diffuser 153 and the contraction 154 may be spaced apart from the outer edges of the disks 115 in radial directions 142, 143 by, for example, approximately 0.5 mm. The contraction 154 may be provided for re-accelerating bypass airflow 160 to provide efficient energy conversion for the air flow from pressure energy to kinetic energy prior to merging bypass airflow 160 with air flow 141 around the disks 115.

The use of bypass channel 150 has several advantages, including the ability to reduce aerodynamic buffeting of actuator 121 during the servo writing process and/or during normal operation of disk drive system 111. More specifically, bypass channel 150 reduces the pressure build-up on the upstream side of actuator 121 which occurs when drive 111 is operated. Additionally, directing airflow 160 around the actuator 121 decreases the upstream pressure on the actuator, thus reducing force acting on the actuator 121 while reducing the energy of the bluff-body wake of the actuator arm.

Because embodiments of the present invention reduce aerodynamic buffeting of actuator 121, a more idealized (e.g., round) servo track can be written to disk 115. This in turn facilitates reducing the pitch between servo tracks on the disk and increasing area density for the data storage device.

In embodiments of the present invention, disk drive system 111 may be filled with a gas (e.g., helium) rather than ambient air. This may be advantageous in that helium is a lighter gas than ambient air and causes less buffeting of actuator 121 when disk drive system 111 is in operation. In embodiments of the present invention, disk drive 111 may be sealed after the servo writing process to keep the helium in the drive. Alternatively, the helium may be removed from disk drive 111 and ambient air is allowed to return into the disk drive prior to sealing first opening 151 and second opening 152.

Figure 2:
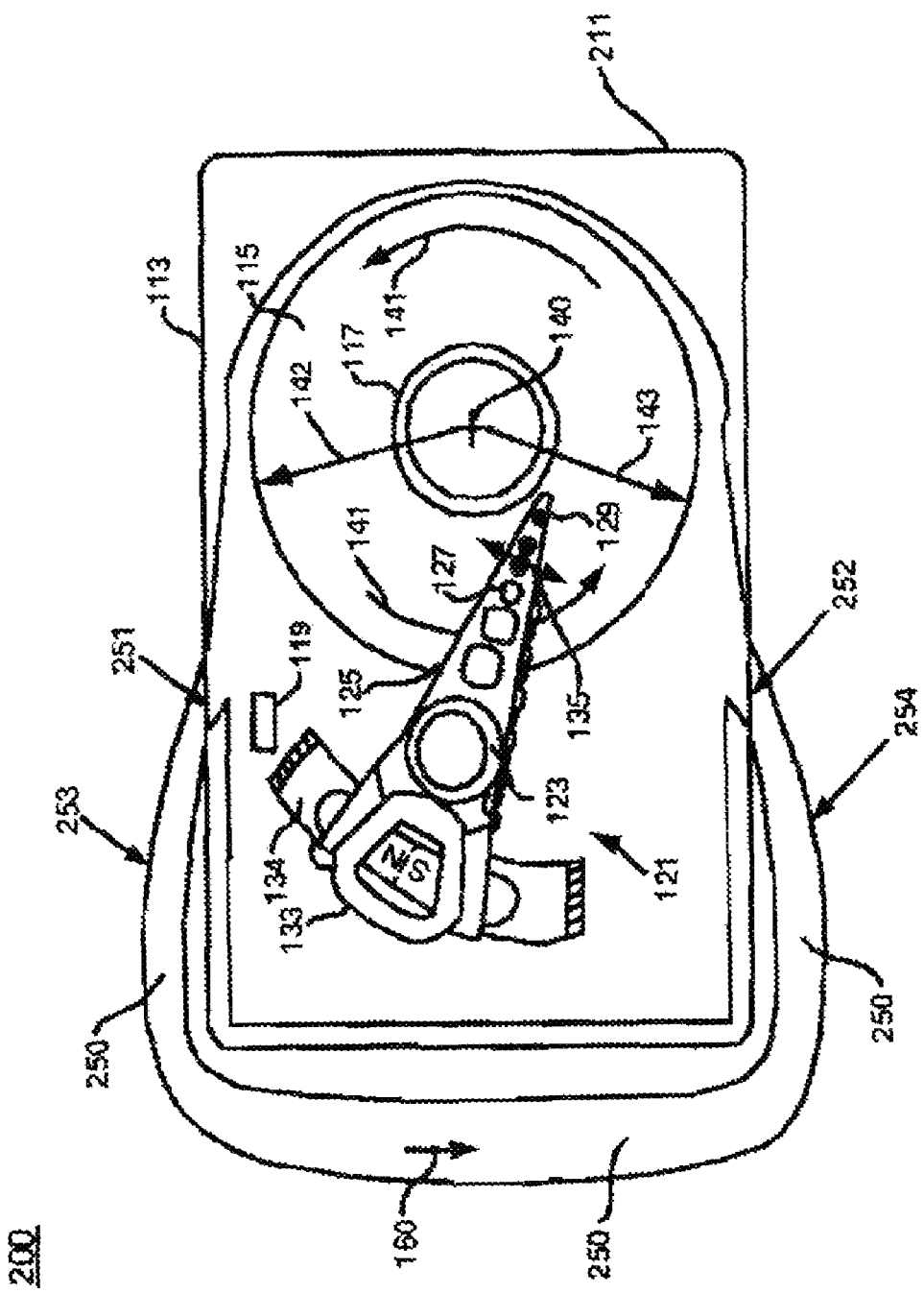
FIG. 2 shows an exemplary information storage system in accordance with another embodiment of the present invention.

FIG. 2 is a schematic drawing of another information storage system 200 in accordance with embodiments of the present invention. For clarity, various components which are typically common to disk drive system 111 and disk drive system 211 (e.g., disk 115, actuator arms 125, etc.) will retain the numbering used above with reference to FIG. 1. In system 200, airflow 160 is conveyed outside of housing 113 to a bypass channel 250 via first opening 251 which extends through housing 113. In the embodiment of FIG. 2, bypass channel 250 comprises a conduit outside of housing 113 which conveys airflow 160 from first opening 251 to a second opening 252 which also extends through housing 113. Airflow 160 then re-enters housing 113 via second opening 252.

As discussed above with reference to FIG. 1, one embodiment of the bypass channel 250 constructed in accordance with the present invention also comprises a diffuser 253. In the embodiment shown, the diffuser 253 is located in the bypass channel 250 and is positioned adjacent to the upstream side of the disk pack or disks 115. The diffuser 253 is also offset upstream from the disks 115 in the radial direction 142, such that the diffuser 253 reduces airflow drag from the disks 115 due to the shedding of disk wakes into the bypass channel 250.

Alternatively, or operating in conjunction with the diffuser 253, another embodiment of bypass channel 250 may include a contraction 254 (e.g., a Venturi). The contraction 254 is also located in the bypass channel 250, but is adjacent to the downstream side of the disk pack or disks 115. Like the diffuser 253, the contraction 154 is typically offset downstream from the disks 115, but in a radial direction 143. Each of the diffuser 253 and the contraction 254 may be spaced apart from the outer edges of the disks 115 in radial directions 142, 143 by, for example, approximately 0.5 mm. The contraction 254 may be provided for re-accelerating bypass airflow 160 to provide efficient energy conversion for the air flow from pressure energy to kinetic energy prior to merging bypass airflow 160 with air flow 141 around the disks 115.

In embodiments of the present invention, bypass channel 250 may be a permanent structure, or a temporary structure which is only used, for example, during the servo writing process for disk drive system 211. Because current industry trends are directed to reducing the overall size of mass storage devices, the bypass channel 250 may not be desired after the servo writing process is performed in order to decrease the size of disk drive system 211. Thus, in one embodiment, bypass channel may be removed (e.g., removed entirely or simply cut off from housing 113) after the servo writing process has been performed and first opening 251 and second 252 may be sealed (e.g., taped or plugged) shut and bypass channel 250 may be cut off between the heat sealed areas.

In one embodiment, bypass channel 250 may be fabricated from a collapsible material. When disk drive system 211 is in operation, airflow 160 generates sufficient air pressure to keep bypass channel 250 inflated. However, when disk drive system 211 is not in operation, bypass channel 250 collapses. In embodiments of the present invention, after the servo writing process has been performed, bypass channel 250 may simply be heat sealed proximate to first opening 251 and second opening 252. In another embodiment, the collapsed bypass channel 250 may simply be taped to housing 113 to prevent re-inflating during subsequent operation of disk drive system 211. This is advantageous during a self-servo writing process because the opportunity for particles or other contaminants to enter housing 113 can be reduced.

As described above with reference to FIG. 1, disk drive system 211 may be filled with helium gas during the servo writing process. Disk drive system 211 may then be sealed while still filled with helium gas, or ambient air may be introduced into fill disk drive system 211 prior to sealing first opening 251 and second opening 252.

Figure 3:
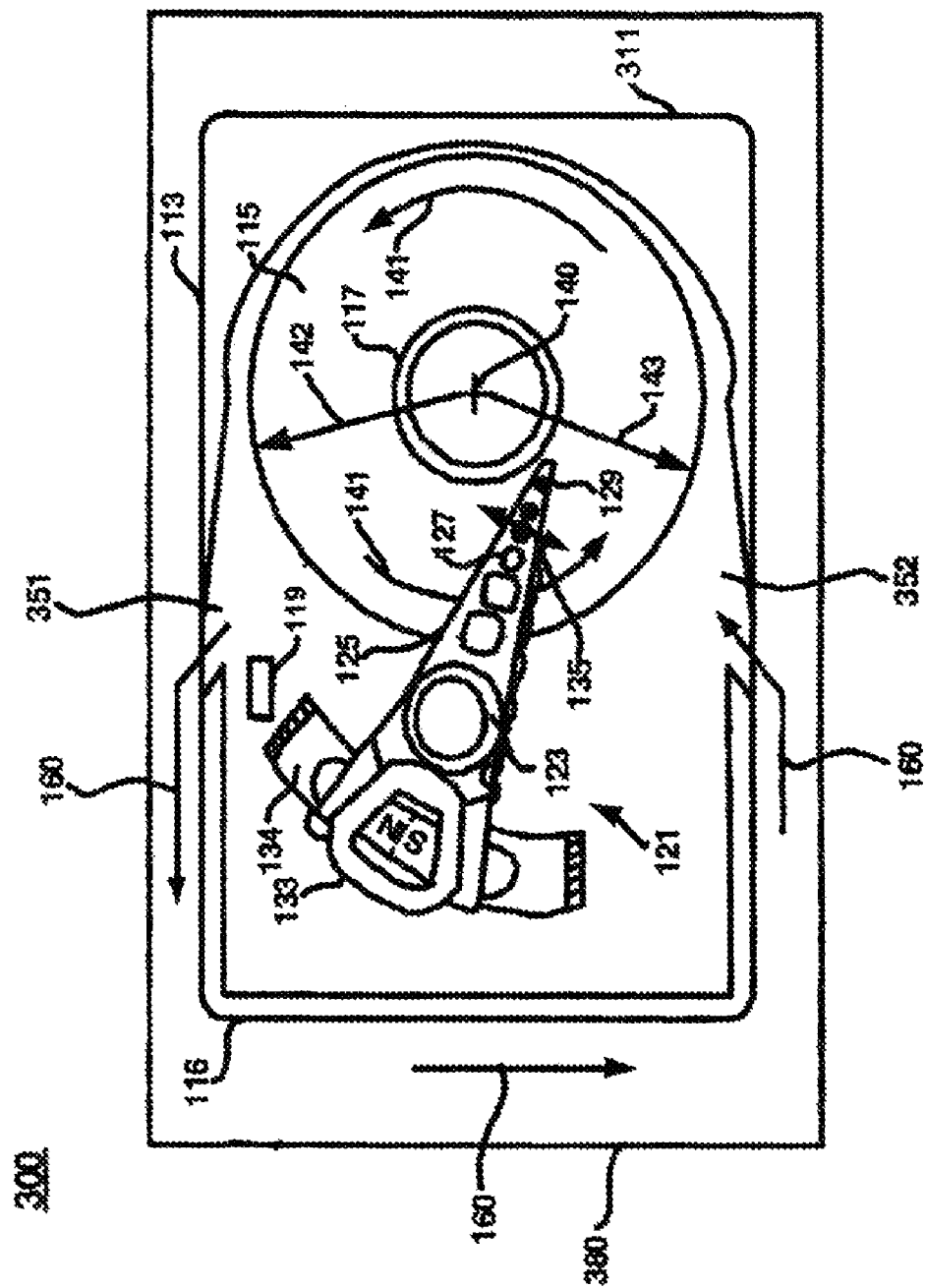
FIG. 3 shows an exemplary information storage system in accordance with another embodiment of the present invention.

FIG. 3 is a schematic drawing of another information storage system 300 in accordance with embodiments of the present invention. For clarity, various components which are typically common to disk drive system 111 and disk drive system 311 (e.g., disk 115, actuator arms 125, etc.) will retain the numbering used above with reference to FIG. 1. In system 300, disk drive system 311 is placed in a sealed environment 380 such as a clean room or other container. It is noted that sealed environment 380 may be filled with helium as described above with reference to FIG. 1. When disk drive system 311 is operated, airflow 160 is conveyed outside of housing 113 via first opening 351 which extends through housing 113. Airflow 160 then mixes with the ambient airflow of sealed environment 380 and generally travels in the direction indicated to second opening 352 which also extends through housing 113. Airflow 160 then re-enters housing 113 via second opening 352.

As described above, after the servo writing process is completed, first opening 351 and second opening 352 are then sealed to prevent contamination as described above with reference to FIG. 3. It is noted that while FIG. 1, FIG. 2, and FIG. 3 show specific locations for the first opening (e.g., 151, 251 and 351 respectively) and the second opening (e.g., 152, 252 and 352 respectively), embodiments of the present invention are not limited to these configurations alone. For example, referring to FIG. 3 first opening 351 and/or second opening 352 may be moved closer to, or farther from actuator 121 according to desired performance characteristics. Additionally, first opening 351 and/or second opening 352 may be disposed in, for example, a top cover (not shown) of housing 113 proximate to the downstream and upstream sides of actuator 121.

Figure 4:
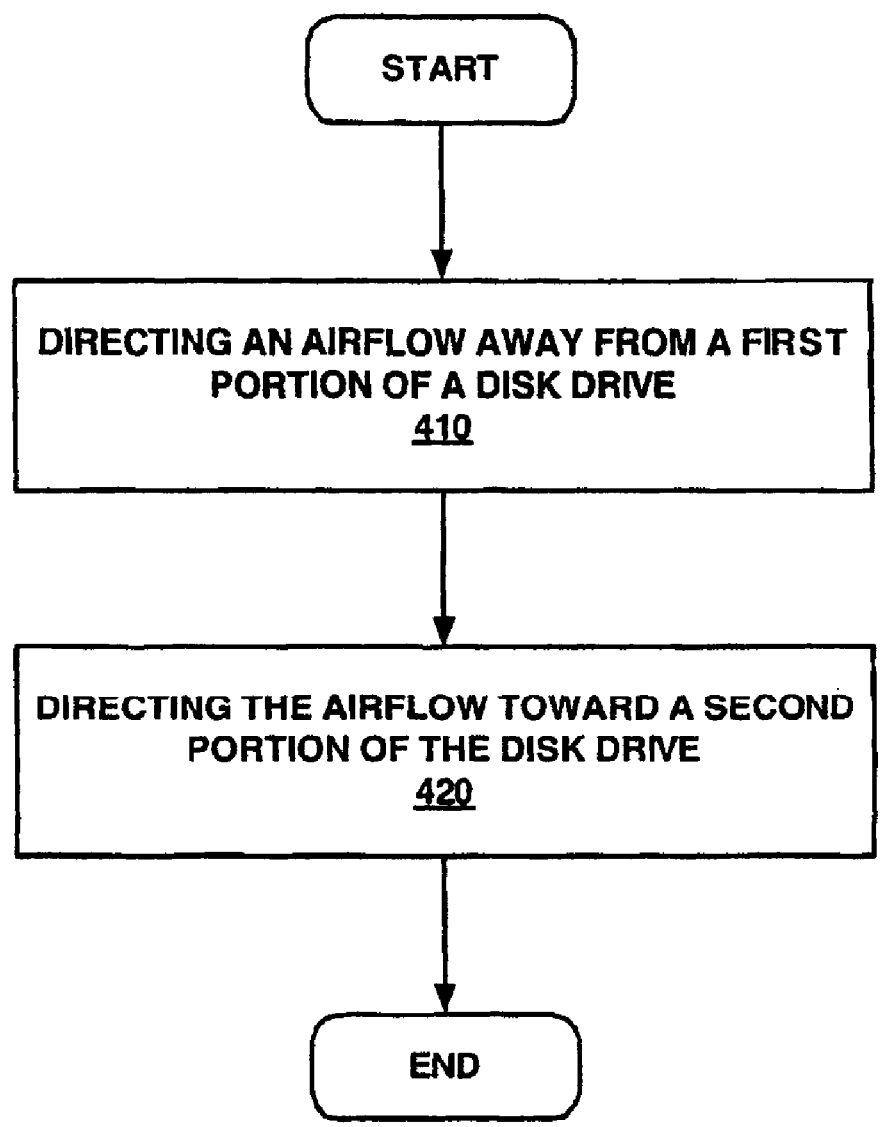
FIG. 4 is a flowchart of a method for reducing aerodynamic buffeting in a disk drive in accordance with embodiments of the present invention.

FIG. 4 is a flowchart of a method 400 for reducing aerodynamic buffeting in a disk drive. In step 410 of FIG. 4, an airflow generated by operating a disk drive is directed away from a portion of the disk drive. With reference to FIG. 1, airflow 160 is directed away from a portion of disks 115 (e.g., proximate to radial direction 142) via first opening 151.

In step 420 of FIG. 4, the airflow is directed toward a second portion of the disk drive. Referring again to FIG. 1, airflow 160 is directed through bypass channel 150 to second opening 152 wherein airflow 160 is directed to a second portion (e.g., proximate to radial direction 143) of disk drive 115. In so doing, embodiments of the present invention facilitate reducing aerodynamic buffeting of actuator 121 when disk drive system 111 is operated. When used during a servo writing process, this facilitates reducing track pitch, thus increasing area density on the disk drive system.

The preferred embodiment of the present invention, a bypass channel for a disk drive, is thus described. While the present invention has been described in particular embodiments, it should be appreciated that the present invention should not be construed as limited by such embodiments, but rather construed according to the following claims.

What is claimed is:

1. A hard disk drive comprising:
   a housing;
   a disk pack mounted to the housing and having at least one disk that is rotatable relative to the housing, the disk pack defining an axis of rotation and a radial direction relative to the axis, and the disk pack having an upstream side wherein air flows away from the at least one disk, and a downstream side wherein air flows toward the at least one disk;
   an actuator mounted to the housing and being movable relative to the disk pack, the actuator having at least one head for reading data from and writing data to the at least one disk;
   a collapsible bypass channel exhibiting low airflow resistance for directing the airflow generated by rotation of the at least one disk from the upstream side of the disk pack to the downstream side of the disk pack.

2. The hard disk drive of claim 1 wherein said collapsible bypass channel comprises a bypass channel which is external to said housing.

3. A data storage device comprising:
   a housing;
   a disk pack mounted to the housing and having at least one disk that is rotatable relative to the housing, the disk pack defining an axis of rotation and a radial direction relative to the axis, and the disk pack having an upstream side wherein air flows away from the at least one disk, and a downstream side wherein air flows toward the at least one disk;
   an actuator mounted to the housing and being movable relative to the disk pack; and
   a bypass channel fabricated from a collapsible material, said bypass channel disposed outside of said housing and configured for directing an airflow generated by rotation of the at least one disk from the upstream side of the disk pack to the downstream side of the disk pack.

4. The data storage device of claim 3 wherein said bypass channel exhibits low flow resistance to said airflow.

5. The data storage device of claim 3 wherein said bypass channel comprises a collapsible device.

6. The data storage device of claim 3 wherein said airflow comprises helium gas.

7. A method for reducing aerodynamic buffeting in a disk drive, said method comprising:
   directing an airflow away from a first upstream portion of said disk drive, wherein said airflow is generated by operating said disk drive;
   directing said airflow toward a second downstream portion of said disk drive using a bypass channel which is disposed outside of a housing of said disk drive;
   fabricating said bypass channel from a collapsible material; and
   coupling a first opening in a housing of said disk drive with a second opening in said disk drive using said bypass channel and wherein said bypass channel exhibits low flow resistance to said airflow.

8. The method as recited in claim 7 further comprising:
   using said bypass channel during a servo writing process.

9. The method as recited in claim 8 further comprising:
   sealing said first opening and said second opening after said servo writing process is completed.

10. The method as recited in claim 7 further comprising:
    filling said disk drive with helium gas, and wherein said airflow comprises the helium gas.

* * * * *